United States Patent [19]

Lee et al.

[11] Patent Number: 5,919,889
[45] Date of Patent: Jul. 6, 1999

[54] MELT PROCESSABLE POLY(ESTER-AMIDE) CAPABLE OF FORMING AN ANISOTROPIC MELT CONTAINING AN AROMATIC MOIETY CAPABLE OF FORMING AND AMIDE LINKAGE

[75] Inventors: Cherylyn Lee, Fanwood; Larry F. Charbonneau, Mendham, both of N.J.

[73] Assignee: Hoechst Celanese Corporation, Somerville, N.J.

[21] Appl. No.: 07/996,423

[22] Filed: Dec. 23, 1992

Related U.S. Application Data

[62] Division of application No. 07/687,801, Apr. 19, 1991, Pat. No. 5,204,443.

[51] Int. Cl.$^6$ .......................... C08G 63/00; C08G 63/02; C08G 63/18
[52] U.S. Cl. .......................... 528/184; 528/176; 528/183; 528/185; 528/190; 528/193
[58] Field of Search ....................... 528/176, 183, 528/184, 185, 190, 193

[56] References Cited

U.S. PATENT DOCUMENTS

| | | | |
|---|---|---|---|
| 4,081,428 | 3/1978 | Thompson | 528/183 |
| 4,272,625 | 6/1981 | McIntyre et al. | 528/183 |
| 4,562,244 | 12/1985 | Yoon | 528/190 |
| 4,833,229 | 5/1989 | Magagnini et al. | 528/193 |
| 5,030,703 | 7/1991 | Pielartzik et al. | 528/193 |

*Primary Examiner*—Terressa Mosley

[57] ABSTRACT

A melt processable poly(ester-amide) which is capable of forming an anisotropic melt phase is provided. A poly(ester-amide) of the present invention may have recurring units of: (a) 4-hydroxybenzoyl moiety, (b) 6-oxy-2-naphthoyl moiety, (c) 4,4'-biphenol moiety, (d) terephthaloyl moiety, and (e) an aromatic moiety capable of forming an amide linkage in the proportions indicated. Preferably, the moiety capable of forming an amide linkage is derived from p-aminophenol, p-phenylenediamine, N-acetyl-p-aminophenol, etc. The resulting poly(ester-amide) is capable of undergoing melt-processing in the temperature range of from about 300° to about 400° C.

21 Claims, No Drawings

MELT PROCESSABLE POLY(ESTER-AMIDE) CAPABLE OF FORMING AN ANISOTROPIC MELT CONTAINING AN AROMATIC MOIETY CAPABLE OF FORMING AND AMIDE LINKAGE

This is a divisional of application Ser. No. 07/687,801 filed on Apr. 19, 1991 now U.S. Pat. No. 5,204,443.

TECHNICAL FIELD

The present invention relates generally to high performance liquid-crystal polyester resins and more specifically to a melt-processable polyester-amide capable of forming an anisotropic melt derived from 4-oxybenzoyl, 6-oxy-2-naphthoyl, terephthaloyl, biphenol and an aromatic moiety capable of forming an amide linkage.

BACKGROUND OF THE INVENTION

Liquid crystalline or thermotropic polyesters capable of forming an anisotropic melt are known high performance materials useful for manufacturing films, fibers, molded articles and like items. While these materials typically exhibit superior temperature resistance and mechanical properties as compared to commodity resins, they are often times difficult to synthesize and melt-process due to a tendency to become intractable if the composition is not carefully controlled, or alternatively, desirable properties as aforementioned can be lacking if the ratio and/or selection of components is not within critical ranges.

Various attempts have been made to improve the processability and/or mechanical properties of liquid crystalline polyesters, including by the incorporation of amide linkages into such polymers.

U.S. Pat. No. 4,282,842 discloses poly(ester-amides) prepared from an aromatic dicarboxylic acid, ethylene glycol, and a p-acylaminobenzoic acid. A similar disclosure is Japanese Publication 54-125271. European Patent Application No. 79301276.6 (Publication No. 0 007 715) discloses melt processable fiber-forming poly(ester-amides) comprising residues of one or more aminophenols selected from p-aminophenol and p-N-methylaminophenol and residues of one or more dicarboxylic acids. The poly(ester-amide) disclosed contains a balance of linear difunctional residues and dissymmetric difunctional residues derived from either the aminophenols or their acids. The linear difunctional residues and dissymmetric difunctional residues are chosen so as to give a product which melts below its decomposition temperature and exhibits optical anisotropy in the melt.

U.S. Pat. No. 3,859,251 discloses a poly(ester-amide) which comprises 50 to 100 mole percent of the moiety derived from an acyclic aliphatic dicarboxylic acid.

U.S. Pat. No. 3,809,679 discloses poly(ester-amides) consisting of 10 to 90 mole percent of recurring structural units derived from a dicarboxylic acid dihalide and a dihydroxy compound of a specified formula and 10 to 90 mole percent of recurring structural units derived from a dicarboxylic acid dihalide and a diamino compound of a specified formula. The poly(ester-amides) described specifically exclude moieties derived from aromatic hydroxyacids, such as the 6-oxy-2-naphthoyl moiety included in the poly(ester-amide) of the present invention.

Commonly assigned U.S. Pat. No. 4,330,457, incorporated herein by reference, discloses melt processable poly (ester-amides) capable of forming an anisotropic melt phase derived from 6-hydroxy-2-naphthoic acid, dicarboxylic acid, and aromatic monomer capable of forming an amide linkage. The resulting poly(ester-amide) exhibits a melting temperature below approximately 400° C.

Other poly(ester-amides) are disclosed and claimed in U.S. Pat. Nos. 4,966,956; 4,355,132 and 4,339,375. The '956 patent teaches a four-component poly(ester-amide) including 4-oxybenzoyl, biphenol, an amide-forming monomer and either terephthaloyl or isophthaloyl moieties.

Commonly assigned U.S. Pat. No. 4,473,682, incorporated herein by reference, discloses melt processable polyesters capable of forming an anisotropic melt comprising a relatively low concentration of 6-oxy-2-naphthoyl moiety, 4-oxybenzoyl moiety, 4,4'-dioxybiphenyl moiety, and terephthaloyl moiety. This polyester forms an atypical highly tractable anisotropic melt phase.

Commonly assigned U.S. Pat. No. 4,351,917, incorporated herein by reference, discloses a melt processable poly(ester-amide) which is capable of forming an anisotropic melt phase derived from 6-hydroxy-2-naphthoic acid, an aromatic moiety capable of forming an amide linkage, and optionally, other aromatic moieties derived from aromatic hydroxyacid.

Commonly assigned U.S. Pat. No. 4,351,918, incorporated herein by reference, shows a melt processable poly (ester-amide) which is capable of forming an anisotropic melt phase derived from 6-hydroxy-2-naphthoic acid, other aromatic hydroxyacid, carbocyclic dicarboxylic acid, and aromatic monomers capable of forming an amide linkage.

SUMMARY OF THE INVENTION

It has been found that compositions in accordance with the present invention have a unique combination of temperature resistance, mechanical properties and processability at relatively low temperature.

A melt processable poly(ester-amide) capable of forming an anisotropic melt phase at a temperature below approximately 400° C. is provided. The poly(ester-amide) of the present invention contains recurring moieties I, II, III, IV, and V wherein:

I is
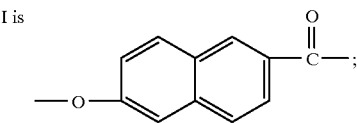

II is
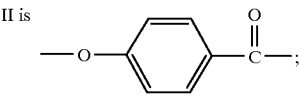

III is
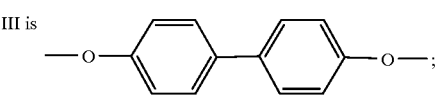

IV is
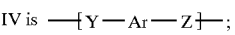

wherein Ar is a divalent moiety containing at least one aromatic ring, Y & Z are divalent organic or inorganic radicals and may be the same or different and include at least one member selected from the group consisting of NH or NR where R is a 1–6 carbon containing alkyl moiety or an aryl moiety; and V is the residue of an aromatic di-oyl precursor.

Generally speaking, the poly(ester-amide) of the present invention contains from about 1 to about 15 mole percent of moiety I, from about 20 to about 70 mole percent moiety II, from about 5 to about 40 mole percent of moiety III, from about 1 to about 20 mole percent of moiety IV, and from about 5 to about 40 mole percent of moiety V.

Typically, the compositions contain from about 2.5 to about 10 mole percent moiety I, 20 to 70 mole percent moiety II, 5 to 25 mole percent moiety I II, 2.5 to 15 percent moiety IV, and 2.5 to 15 percent of moiety V. A preferred composition contains about 2.5 to 7.5 mole percent moiety I, at least 50 mole percent of moiety II, from about 5 to about 20 percent of moiety III, from about 2.5 to 10 mole percent of moiety IV, and about 15 to 25 mole percent of moiety V.

A preferred moiety IV is

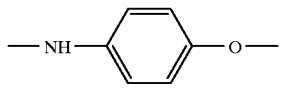

derived from p-aminophenol or N-acetyl-p-aminophenol.

Moiety V is most preferably a terephthaloyl moiety but may be selected from the group consisting of isophthaloyl, terephthaloyl or mixtures thereof.

The melt-processable poly(ester-amide) according to the invention is capable of forming an anisotropic melt phase below about 350° C. and is capable of undergoing melt-processing in the temperature range of from about 300° C. to about 400° C. A melt processable poly(ester-amide) according to the invention may exhibit an inherent viscosity in the range of about 1.0 to 12.0 dl/g when dissolved in a concentration of 0.1 percent by weight in pentafluorophenol at 60° C. and may exhibit a melt viscosity in the range of from about 50 to 1500 poise at a shear rate of $10^3$ sec$^{-1}$ measured at 365° C. in a capillary rheometer.

The compositions according to the invention are useful for making shaped articles such as fibers and molded articles as will become apparent from the examples hereinafter provided.

DETAILED DESCRIPTION

The poly(ester-amide) of the present invention includes five recurring moieties which when combined in the poly (ester-amide) have been found to form an atypical highly tractable anisotropic melt phase at a temperature below approximately 400° C., and preferably below approximately 370° C. (e.g., approximately 350° C. in a particularly preferred embodiment). The poly(ester-amide) melt endotherm ($T_m$) may be confirmed by the use of a differential scanning calorimeter (DSC) employing repeat scans at a 20° C. per minute heat-up rate and observing the peak of the DSC melt transition. The poly(ester-amide) of the present invention may be considered crystalline in the sense that fibers melt extruded therefrom exhibit X-ray diffraction patterns using Ni-filtered CuKα radiation and flat plate cameras characteristic of polymeric crystalline materials. Because of its ability also to exhibit anisotropic properties (i.e., liquid crystalline properties) in the melt, the poly(ester-amide) readily can form a product having a highly oriented molecular structure upon melt processing. Such product has been found to exhibit unusually high tenacity and modulus. Preferred poly(ester-amides) are capable of undergoing melt processing at a temperature in the range of approximately 320° C. to 390° C. (e.g., at approximately 345° C. to 360° C.).

As will be readily appreciated by those skilled in the art, the present invention is in no way limited by the examples which follow. Although the invention is illustrated specifically with N-acetyl-p-aminophenol providing an amide linkage, such linkages could be derived from p-aminophenol, p-N-methylaminophenol, p-phenylenediamine, N-methyl-p-phenylenediamine, N,N'-dimethyl-p-phenylenediamine, m-aminophenol, 3-methyl-4-aminophenol, 2-chloro-4-aminophenol, 4-amino-1-naphthol, 4-amino-4'-hydroxydiphenyl, 4-amino-4'-hydroxydiphenyl ether, 4-amino-4'-hydroxydiphenyl methane, 4-amino-4'-hydroxydiphenyl ethane, 4-amino-4'-hydroxydiphenyl sulfone, 4-amino-4'-hydroxydiphenyl sulfide, 4,4'-diaminophenyl sulfide (thiodianiline), 4,4'-diaminodiphenyl sulfone, 2,5-diaminotoluene, 4,4'-ethylenedianiline, or 4,4'-diaminodiphenoxyethane, as well as 3,4'-diaminophenyl X, 3-amino-4'-hydroxyphenyl X, and 3-hydroxy-4'-aminodiphenyl X, wherein X is selected from the group consisting of sulfide, sulfone, ether and methane.

The poly(ester-amide) of the present invention may optionally incorporate approximately 1 to 50 percent by weight (preferably approximately 10 to 30 percent by weight), based upon the total weight of the polymers, of a solid filler and/or reinforcing agent when making a molded article. Representative filler materials include calcium silicate, silica, clays, talc, mica, polytetrafluoroethylene, graphite, alumina trihydrate, sodium aluminum carbonate, barium ferrite, wollastonite, etc. Representative reinforcing fibers include glass fibers, graphitic carbon fibers, amorphous carbon fibers, synthetic polymeric fibers, alumina fibers, aluminum silicate fibers, aluminum oxide fibers, titanium fibers, magnesium fibers, rock wool fibers, steel fibers, tungsten fibers, or wollastonite fibers having an aspect ratio greater than 3 to 1.

EXAMPLE I

This example illustrates the preparation of a poly(ester-amide) from a 6 mole reaction mixture of 4-hydroxybenzoic acid ("HBA"), 6-hydroxy-2-naphthoic acid ("HNA"), 4,4'-biphenol ("BP"), terephthalic acid ("TA"), and N-acetyl-p-aminophenol ("APAP") in the ratio 60.0:5.0:12.5:17.5:5.0 (5.0 mole % HNA and 5.0 mole % APAP).

To a 2 litre "Slim Jim" flask equipped with a C-shaped 316 stainless steel, gas inlet tube, thermocouple, a Vigreux column attached to a condenser and receiver were added the following:

(a) 496.8 grams of 4-hydroxybenzoic acid (3.6 moles);

(b) 56.4 grams of 6-hydroxy-2-naphthoic acid (0.3 moles);

(c) 139.5 grams of 4,4'-biphenol (0.75 moles);

(d) 174.3 grams of terephthalic acid (1.05 moles);

(e) 45.3 grams of N-acetyl-p-aminophenol (0.3 moles); the flask was immersed in a sand bath and provided with means to accurately control the temperature. The flask was throughly purged of oxygen by evacuation and flushed with nitrogen three times, and slowly heated in the sand bath; and (f) 10 mls. of a 1.2% (w/v) solution of potassium acetate in acetic acid (60 ppm K$^+$) were added as a catalyst along with 598.8 grams of acetic anhydride (2.5 % excess). Acetic acid began to distill over and was collected in a graduated cylinder.

The contents of the flask were heated while stirring at a rate of 75 rpm (torque=13 mV) to 152° C. over a period of 111 minutes at which time 100 mls. of acetic acid had been collected. The polymerization temperature was then gradually raised to 350° C. over a period of 215 minutes at which time a total of 660 mls. of acetic acid had been collected. The flask was evacuated to a pressure of less than 1.0 mm at 350° C. while stirring. The polymer was stirred at 350° C. until the desired Δ torque was achieved (i.e., Δ torque=50 mV for this example). During this period the polymer melt continued to increase in viscosity while the remaining acetic acid was removed from the flask.

The resulting poly(ester-amide) had an inherent viscosity (I.V.) of 9.1 dl/g as determined in a pentafluorophenol solution of 0.1 percent by weight concentration at 60° C., and a melt viscosity (M.V.) of 581 poise at a shear rate of $10^3$ $sec^{-1}$ measured at 345° C. in a capillary rheometer using an orifice of 0.015 inch diameter and 1.0" length.

$$I.V.=\ln(\eta rel)/c$$

where c concentration of solution (0.1 percent by weight), and ηrel=relative viscosity. The relative viscosity was measured by dividing the flow time in a capillary viscometer of the polymer solution by the flow time for the pure solvent. When the polymer was subject to differential scanning calorimetry (20° C./min. heating rate), it exhibited a melt endotherm ($T_m$) peak at 343° C. The polymer melt was optically anisotropic.

EXAMPLE II–X

In accordance with the foregoing example I, nine additional compositions were prepared having different proportions of the five ingredients noted hereinabove. Composition, melting point, I.V. and M.V. for the inventive compositions appear in Table I below. Unless otherwise indicated, properties were measured as in Example I.

TABLE I

COMPOSITION MELTING POINT, I.V. AND M.V. OF EXAMPLES I–X
COMPOSITION (MOLE PERCENT)

| EXAMPLE | HBA:HNA:BP:TA:APAP | $T_m$, ° C. | I.V. dl/g | M.V. POISE |
|---|---|---|---|---|
| I | 60:5.0:12.5:17.5:5.0 | 343 | 9.1 | 581+ |
| II | 60:5.0:15:17.5:2.5 | 343 | 9.5 | 538+ |
| III | 60:5.0:10.0:17.5:7.5 | 362 | 7.8 | 1015* |
| IV | 60:3.5:15.75:18.25:2.5 | 363 | 8.5 | 428** |
| V | 60:3.5:13.25:18.25:5.0 | 359 | 9.0 | 365** |
| VI | 60:3.5:11.75:18.25:6.5 | 357 | 7.1 | 960** |
| VII | 60:3.5:10.75:18.25:7.5 | 370 | 7.3 | 686** |
| VIII | 50.0:15.0:7.5:17.5:10.0 | 323 | 9.1 | 976++ |
| IX | 40:15.0:17.5:22.5:5.0 | 260 | 8.8 | 878++ |
| X | 30:15.0:22.5:27.5:5.0 | 327 | 8.5 | 567++ |

+measured at 345° C.; *measured at 360° C.
++measured at 340° C.; **measured at 365° C.

COMPARATIVE EXAMPLE A

This example illustrates the preparation of a polyester from a 7 mole reaction mixture of 4-hydroxybenzoic acid, 6-hydroxy-2-naphthoic acid, 4,4'-biphenol, and terephthalic acid in the ratio 60.0:3.5:18.25:18.25 (3.5 mole % HNA and 0.0 mole % APAP). The procedure of Example I was substantially repeated with the exception that the following components were charged into the flask:

(a) 579.6 grams of 4-hydroxybenzoic acid (4.2 moles);

(b) 46.1 grams of 6-hydroxy-2-naphthoic acid (0.24 moles);

(c) 237.6 grams of 4,4'-biphenol (1.28 moles);

(d) 212.1 grams of terephthalic acid (1.28 moles); and (e) 10 mls. of a 1.2% (w/v) solution of potassium acetate in acetic acid (60 ppm $K^+$) were added as a catalyst along with 598.8 grams of acetic anhydride (2.5 % excess); the desired Δ torque was 50 mV, and the reaction temperature was 355° C.

The resulting wholly aromatic polymer had an I.V. of 9.2 dl/g as determined in pentafluorophenol at 60° C., and an M.V. of 492 poise at a shear rate of $10^3$ $sec^{-1}$ measured at 365° C. in a capillary rheometer. When the polymer was subjected to DSC, it exhibited a $T_m$ of 376° C.

COMPARATIVE EXAMPLE B

This example illustrates the preparation of a poly(ester amide) from a 6 mol reaction mixture of 4-hydroxybenzoic acid, isophthalic acid, terephthalic acid, 4,4'-biphenol, and N-acetyl-p-aminophenol in the ratio of 50.0:12.5:12.5:20.0:5.0.

The following components were charged into the flask:

a) 3.0 mole (414.0 g) 4-hydroxybenzoic acid;

b) 0.75 mole (124.5 g) isophthalic acid;

c) 0.75 mole (124.5 g) terephthalic acid;

d) 1.2 mole (223.2 g) 4,4'-biphenol;

e) 0.3 mole (45.3 g) N-acetyl-p-aminophenol; and f) 10 ml of a 1.2 (w/v) solution of potassium acetate in acetic acid (60 ppm $K^+$) were added as a catalyst along with 600 ml acetic anhydride (2.5% excess) and heated to 350° C. The resulting wholly aromatic polymer had an I.V. of 3.6 dl/g as determined in pentafluorophenol at 60° C., and an M.V. in the range of about 500–700 poise at a shear rate of $10^3$ $sec^{-1}$ measured at 340° C. in a capillary rheometer. When the polymer was subject to DSC, it exhibited a $T_m$ of 281° C.

FIBER PROPERTIES

Fibers were prepared from the compositions of Examples IV, V, and Comparative Example A. The fibers were heat-treated for eight hours in a nitrogen atmosphere at 300° C. in an oven. Tenacity, elongation and modulus were defined in accordance with ASTM D 3822-90 and reported in Table II, below, along with corresponding data for Comparative Example B wherein the heat treatment was in stepwise fashion, 2 hours at 230° C., followed by 16 hours at 270° C. Examples IV, V, A are approximately 5 denier. The polymer of Example B was difficult to spin; unable to achieve 5 denier fiber, but 8.5 denier fiber was made.

TABLE II

FIBER PROPERTIES
AFTER HEAT TREATMENT*

| POLYMER OF EXAMPLE | TENACITY g/d | MODULUS g/d | ELONGATION % |
|---|---|---|---|
| IV | 29.2 | 1040 | 2.5 |
| V | 31.9 | 1060 | 2.7 |
| A | 21–22 | 910 | 2.2–2.3 |
| B | 16 | 475 | 3.0 |

*Single Filament

As may be seen from Table II, compositions in accordance with the present invention exhibit both higher modulus and tenacity than other liquid crystalline polymers. This surprising and highly useful characteristic makes such compounds particularly suitable for high performance applications.

While the present invention has been described hereinabove in connection with numerous examples, various modifications will be apparent to those of skill in the art. Such modifications are within the spirit and scope of the present invention, which is limited and defined only by the appended claims.

We claim:

1. A method of producing a poly(ester-amide) fiber which exhibits a tenacity of at least about 30 g/d, a modulus of at least about 1000 g/d, and an elongation of at least about 2.5 percent, comprising the steps of:

(a) preparing a melt processable poly(ester-amide) composition capable of forming an anisotropic melt phase at a temperature of below about 400° C. consisting of recurring moieties I, II, III, IV and V wherein:

I is 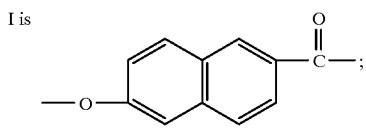

II is 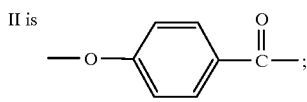

III is 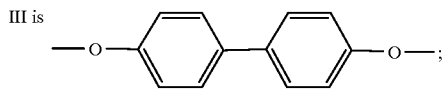

IV is 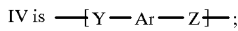;

wherein Ar is a divalent moiety containing at least one aromatic ring, Y and Z are divalent radicals which are the same or different and include at least one member selected from the group consisting of NH or NR where R is a 1–6 carbon containing alkyl moiety or an aryl moiety; and V is the residue of an aromatic dioyl precursor or mixtures of terephthaloyl with other aromatic dioyls, wherein said poly (ester-amide) consists of moiety I present in amounts from about 1 to about 15 mole percent, moiety II present in amounts from about 20 to about 70 mole percent, moiety III present in amounts from about 5 to about 40 mole percent, moiety IV present in amounts from about 1 to about 20 mole percent, and moiety V present in amounts from about 5 to about 40 mole percent;

(b) heating the composition to a temperature from about 300° to about 400° C. to form a polymer melt; and (c) spinning the polymer melt to form a fiber.

2. The method according to claim 1 wherein moiety IV is of the formula:

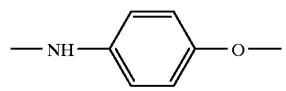

3. The method according to claim 2 wherein moiety IV is derived from the group consisting of p-aminophenol and N-acetyl-p-aminophenol.

4. The method according to claim 3 wherein moiety IV is derived from N-acetyl-p-aminophenol.

5. The method according to claim 4 wherein moiety V is selected from the group consisting of isophthaloyl, terephthaloyl, and mixtures thereof.

6. The method according to claim 5 wherein moiety V is terephthaloyl.

7. The method according to claim 6 wherein the poly (ester-amide) composition is capable of forming an anisotropic melt phase at a temperature of about 350° C.

8. The method according to claim 7 wherein the poly (ester-amide) composition exhibits an inherent viscosity in the range of about 1.0 to about 12.0 dl/g when dissolved in a concentration of 0.1 percent by weight of pentafluorophenol at 60° C.

9. The method according to claim 6 wherein the poly (ester-amide) composition exhibits a melt viscosity in the range of about 50 to about 2500 poise at a shear rate of $10^3$ $sec^{-1}$ measured at 365° C. in a capillary rheometer.

10. The method according to claim 7 wherein the poly (ester-amide) composition undergoes melt processing at a temperature from about 320° C. to about 390° C.

11. A fiber produced according to the method of claim 10.

12. A method of producing a poly(ester-amide) fiber which exhibits a tenacity of at least about 30 g/d, a modulus of at least about 1000 g/d, and an elongation of at least about 2.5 percent, comprising the steps of:

(a) preparing a melt processable poly(ester-amide) composition capable of forming an anisotropic melt phase at a temperature of below about 400° C. consisting of recurring moieties I, II, III, IV and V wherein:

I is 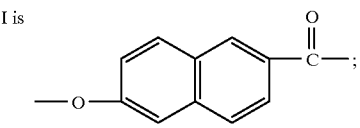

II is 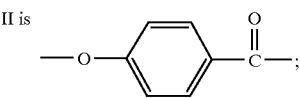

III is 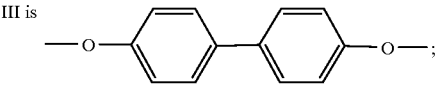

IV is 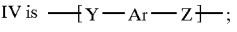;

wherein Ar is a divalent moiety containing at least one aromatic ring, Y and Z are divalent radicals and are the same or different and include at least one member selected from the group consisting of NH or NR where R is a 1–6 carbon containing alkyl moiety or an aryl moiety; and V is the residue of an aromatic dioyl precursor or mixtures of terephthaloyl with other aromatic dioyls, wherein said poly(ester-amide) consists of moiety I present in amounts from about 2.5 to about 10 mole percent, moiety II present in amounts from about 20 to about 70 mole percent, moiety III present in amount from about 5 to about 25 mole percent, moiety IV present in amounts from about 1.0 to about 6.5 mole percent, and moiety V present in amounts from about 10 to about 25 mole percent;

(b) heating the composition at a temperature from about 300° to about 400° C. to form a polymer melt; and (c) spinning the polymer melt to form a fiber; and (d) heat treating the fiber in an inert atmosphere at a temperature from about 230° to about 300° C. to form a heat-treated fiber.

13. The method according to claim 2 wherein moiety I is present in an amount of about 5.0 mole percent, moiety II is present in an amount of about 60 mole percent, moiety III is present in an amount of about 12.5 mole percent, moiety IV is present in an amount of about 5.0 mole percent, and moiety V is present in an amount of about 17.5 mole percent.

14. The method according to claim 3 wherein moiety IV is derived from the group consisting of p-aminophenol and N-acetyl-p-aminophenol.

15. The method according to claim 4 wherein moiety IV is derived from N-acetyl-p-aminophenol.

16. The method according to claim 5 wherein moiety V is selected from the group consisting of isophthaloyl, terephthaloyl and mixtures thereon.

17. The method according to claim 6 wherein moiety V is terephthaloyl.

18. The method according to claim 17 wherein the aromatic rings of moieties I, II, III, IV, and V are substantially free of ring substitution.

19. The method according to claim 18 wherein the poly (ester-amide) composition is capable of forming an anisotropic melt phase at a temperature of about 350° C.

20. The method according to claim 19 wherein the fiber is heat treated for about 8 hours.

21. A heat-treated, single filament fiber produced according to the method of claim 20 which exhibits a tenacity of at least about 30 g/d, a modulus of at least about 1000 g/d, and an elongation of at least about 2.5 percent.

* * * * *